UNITED STATES PATENT OFFICE.

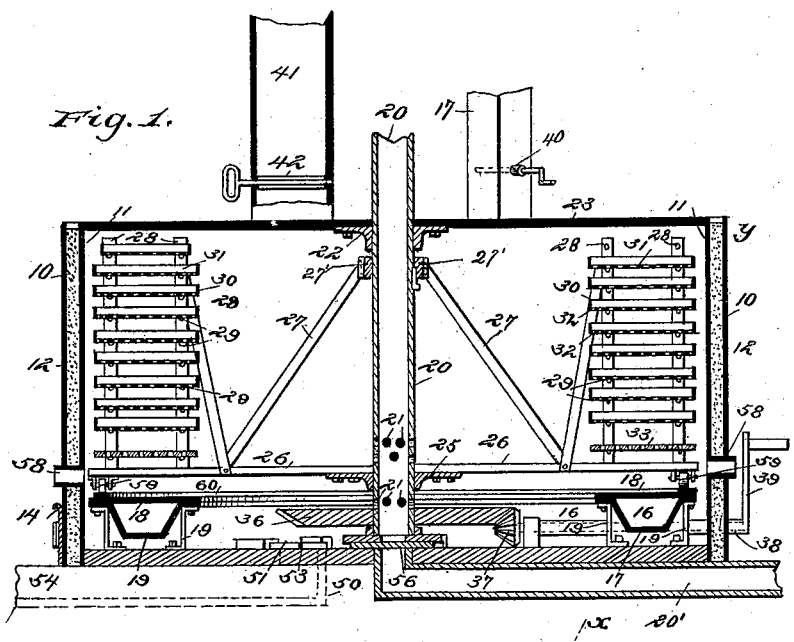

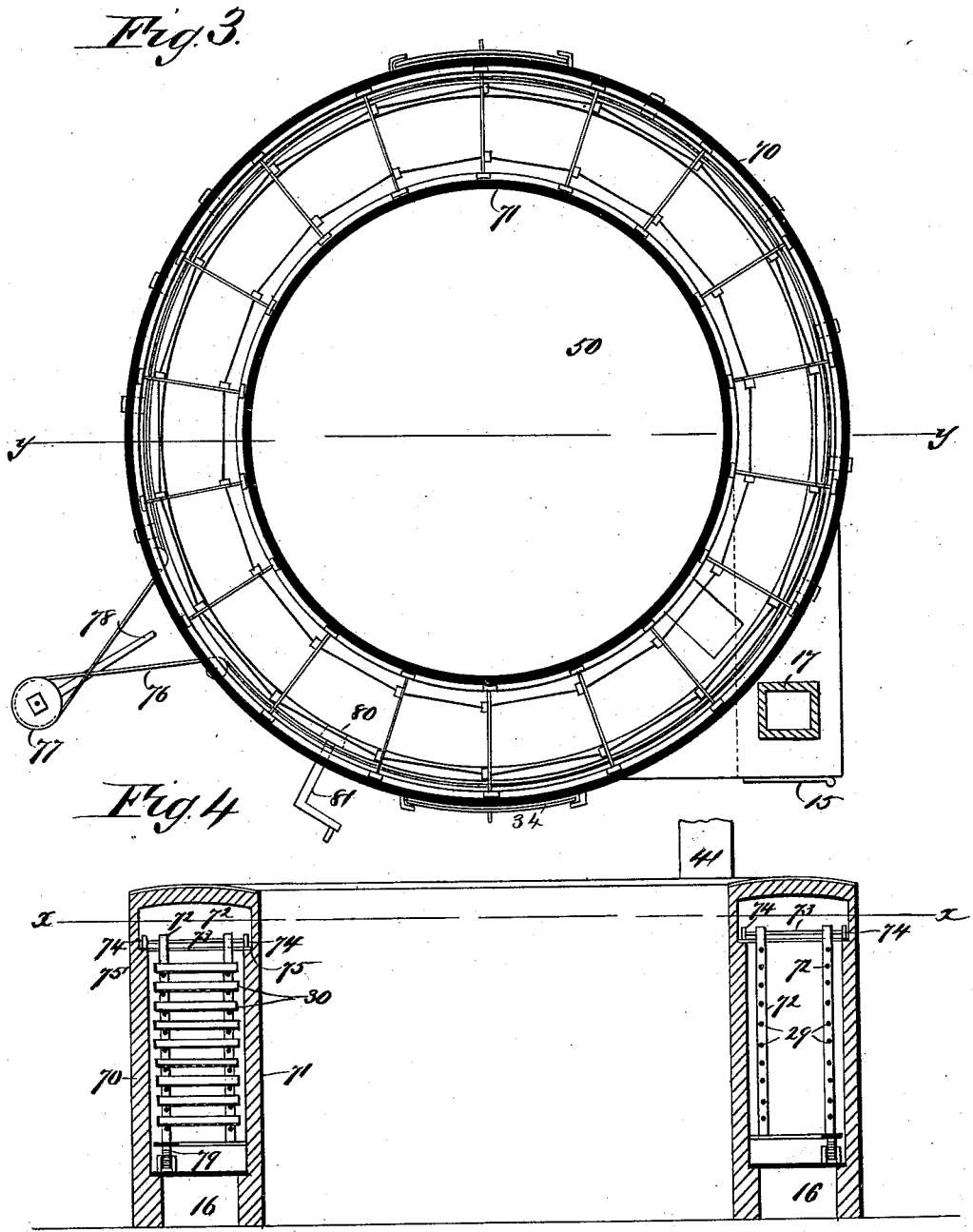

FREDERICK ALTMAN, OF SAN JOSÉ, CALIFORNIA.

FRUIT-DRIER.

SPECIFICATION forming part of Letters Patent No. 400,993, dated April 9, 1889.

Application filed December 2, 1887. Serial No. 256,783. (No model.)

*To all whom it may concern:*

Be it known that I, FREDERICK ALTMAN, of San José, in the county of Santa Clara and State of California, have invented a new and Improved Fruit-Drier, of which the following is a full, clear, and exact description.

This invention relates to an economical, cheap, and durable fruit-drier, the object of the invention being to provide for the storing of large quantities of fruit in the hottest portion of the drying-chamber and to so arrange the fruit-carrying trays that all of the fruit contained within the drier will be equally and uniformly acted upon by the heat, the apparatus being so arranged that the discharge of the moisture-laden air may be controlled to suit the requirements of the particular kind of fruit being operated upon, while the carbonic acid generated in the course of the drying of the fruit will be discharged through an opening formed in the flooring of the drier, all as will be hereinafter more fully described, and specifically pointed out in the claims.

Reference is to be had to the accompanying drawings, forming a part of this specification, in which similar figures of reference indicate corresponding parts in all the views.

Figure 1 is a cross-sectional elevation of my improved form of fruit-drier, the view being taken upon a line corresponding with the line $x\,x$ of Fig. 2. Fig. 2 is a sectional plan view taken on line $y\,y$ of Fig. 1. Fig. 3 is a sectional plan view of a modified construction, the view being taken on line $x\,x$ of Fig. 4; and Fig. 4 is a cross-sectional elevation of the construction illustrated in Fig. 3, the view being taken on line $y\,y$ of said Fig. 3.

Referring now to the construction illustrated in Figs. 1 and 2, 10 represents the outer and 11 the inner wall of the drying-chamber, the space between said walls being filled in with sand or other proper material, 12, which will prevent the radiation of the heat delivered to the chamber within the walls, traps or doors, as 14, being arranged so that the sand or other material, 12, may be discharged at times when it is desired to move the drier from place to place.

At one side of the drum there is arranged a furnace, 15, from which the products of combustion pass through a circular flue, 16, which leads to the stack 17, the top of this flue 16 being formed of metal plates 18, while the side walls and bottom of the flue are preferably formed by a trough-shaped metal structure, 19.

In the center of the chamber within the walls above described there is stepped a vertical rotary hollow shaft, 20, extending from top to bottom of the chamber, having its upper end opening into the open air above the chamber and formed with perforations 21, opening into the chamber of the drum, said pipe being guided and supported by a collar, 22, that is secured to the top 23 of the drier. At a point near the bottom of the rotary hollow shaft 20 there is secured an annular flange, 25, which serves as the support for outwardly-extending horizontal arms 26, which arms are stayed by diagonal braces 27, that are secured thereto and to a flange or ring, 27', secured to the pipe 20.

At points near the ends of the arms 26 there are secured vertical posts or standards 28, two of such posts or standards being carried by each arm, and these standards are connected by wires 29, which serve as the support for the fruit-trays 30, said trays being preferably made with perforated bottoms 31 and metallic side walls, 32.

Just above the level of the arms 26 I mount perforated plates 33, which serve to distribute the heat and prevent the fruit in the lower trays from burning. At one side of the apparatus I provide a sliding door, 34, which rests in ways 35, and is raised when it is desired to insert or remove the fruit-trays 30.

To the rotary hollow shaft 20 there is connected a large gear, 36, which is engaged by a pinion, 37, said pinion being mounted upon a horizontal shaft, 38, which extends out through the walls of the drier and carries a crank-arm, 39. In the stack 17 there is the usual damper, 40. A ventilating-flue, 41, extends upward from the roof 23, and in this flue there is arranged a damper, 42, this flue 41 serving as a vent for the moisture-laden atmosphere within the drier.

In order that the carbonic acid generated in the drying of the fruit may be carried off, I form a pit, 50, as represented in the drawings, the entrance to this pit being controlled by a valve, 51, which is connected to a valve stem and handle, 53, the pit discharging through a conduit, 54, as shown in Fig. 1.

Fresh air is supplied to the interior of the drying-chamber through the perforations 21 of the hollow shaft 20 by means of a pipe, 20', leading from the bottom of hollow shaft 20 beneath the drier to a suitable point. The quantity of air desired to be supplied at the center of the chamber may be regulated by a valve, 56, operated by a rod and handle, 57, as shown. Air is also admitted to the drying-chamber through openings 58, which extend through the side walls of the chamber.

Each of the arms 26 carries a roller or caster, 59, and these rollers travel on a track, 60, which is secured to the upper face of the plate 18.

In operation the trays 30 are placed upon the wires 29, as shown in the drawings, and the crank 39 is revolved, the discharge of the moisture-laden air and of the carbonic acid being controlled by means of the valves arranged in connection with the pit 50 and the flue 41. In Figs. 3 and 4 there is represented a construction wherein 70 is an outer wall and 71 an inner wall concentric therewith. Between the lower portions of these walls I arrange the flue 16. The fruit-rack in this case is made up of a series of vertical strips, 72, which are supported by shafts 73, said shafts being provided with rollers 74, which ride upon ways 75, formed at points near the tops of the walls 70 and 71, the flue 41 and the pit 50 being arranged as illustrated. To turn the rack in this case, I pass a rope or chain, 76, around the upper ends of the outer strips, 72, and carry said rope to and about a windlass, 77, which has a lever-arm, 78, to which a horse or other animal may be attached; or I might secure a rack, 79, in the position illustrated, and drive this rack by means of a pinion, 80, secured to a crank-shaft, 81.

Having thus fully described my invention, I claim as new and desire to secure by Letters Patent—

1. In a fruit-drier, a drying-chamber having a ventilating-flue with a regulating-damper located at its top, a central vertical air-pipe extending from top to bottom of the drying-chamber and having apertures opening into the drying-chamber, the upper end of the central vertical air-pipe having an air-discharge outlet, an air-supply pipe having a regulating-valve and connecting with the lower end of the central vertical air-pipe, a furnace at one side of the drying-chamber, with a circular hot-air flue located in the drying-chamber, and a rotary fruit-tray rack located above the circular hot-air flue, substantially as described.

2. In a fruit-drier, a drying-chamber having a ventilating-flue with a regulating-damper located at its top, a central vertical air-pipe extending from top to bottom of the drying-chamber and having apertures opening into the drying-chamber, the upper end of the central vertical air-pipe having an air-discharge outlet, an air-supply pipe having a regulating-valve and connecting with the lower end of central vertical air-pipe, a pit, and carbonic-acid discharge-pipe located in the bottom of the drying-chamber, and having a regulating-valve with means for operating the same, a furnace located at one side of the drying-chamber, with a circular hot-air flue located in the drying-chamber, and a rotary fruit-tray rack located above the circular hot-air flue, substantially as described.

3. In a fruit-drier, a drying-chamber with air-supply openings in its walls, a central hollow shaft, 20, having air-supply apertures opening into the drying-chamber and an air-supply pipe at its lower end, a rotary frame mounted on the shaft 20 and having at its periphery fruit-tray racks, a furnace with a circular hot-air flue extending beneath the fruit-tray racks, and perforated plates extending between the hot-air flue and the fruit-tray racks, substantially as shown and described.

4. A fruit-drier consisting of a drying-chamber having air-supply openings 58 in its walls, a rotary vertical hollow shaft, 20, with air-supply perforations 21, an air-supply pipe, 20', at its lower end, and a valve, 56, with operating rod and handle 57, radial arms 26, secured to and braced on the shaft 20, and having at their outer ends casters 59, resting on a circular track, 60, and standards 28, with horizontal wires 29, forming racks for supporting fruit-trays, a ventilator-chimney, 41, with damper 42 at the top of the drying-chamber, a pit, 50, at the bottom of the drying-chamber, with door or valve 51, having operating rod and handle 53, and discharge-conduit 54, a furnace, 15, located adjacent to the drying-chamber, with a hot-air flue, 16, extending beneath fruit-tray racks and terminating in a stack, 17, with valve 40, located above the furnace 15, perforated plates 33, mounted at the bottom of the fruit-tray racks above the flue 16, and a mechanism, substantially as described, for rotating the shaft 20 and fruit-tray racks, substantially as shown and described.

5. A fruit-drying apparatus consisting of a drying-chamber having an air-escape chimney and damper at its top, an opening in its bottom, with a pit, valve, and conduit, a rotary circular open-work frame located in the drying-chamber, supporting a series of fruit-trays, and mounted on a vertical rotary hollow shaft having perforations for the admission of air, a damper at its lower end, and an air-pipe, a circular heating-flue extending beneath the series of drying-pans and connecting at one end to a furnace located at one side of the drying-chamber and at the other to a chimney located above the furnace and adjacent thereto, and a mechanism for rotating the hollow shaft and circular fruit-tray frame, substantially as described.

FREDERICK ALTMAN.

Witnesses:
C. S. BIRD,
CHARLES CLARK.